(12) United States Patent
Asif

(10) Patent No.: US 12,166,808 B1
(45) Date of Patent: *Dec. 10, 2024

(54) ULTRA-LOW LATENCY PARSING SYSTEM AND METHOD

(71) Applicant: Morgan Stanley Services Group Inc., New York, NY (US)

(72) Inventor: Joveria Asif, Charlotte, NC (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,150

(22) Filed: Jan. 22, 2024

Related U.S. Application Data

(63) Continuation of application No. 18/366,123, filed on Aug. 7, 2023, now Pat. No. 11,909,801.

(51) Int. Cl.
*H04L 65/75* (2022.01)
*G06Q 40/04* (2012.01)

(52) U.S. Cl.
CPC ........... *H04L 65/764* (2022.05); *G06Q 40/04* (2013.01)

(58) Field of Classification Search
CPC .............................. H04L 65/764; G06Q 40/04
See application file for complete search history.

(56) References Cited

U.S. PATENT DOCUMENTS

| | | | |
|---|---|---|---|
| 9,633,097 B2 * | 4/2017 | Tidwell | G06F 21/71 |
| 10,902,013 B2 | 1/2021 | Lancaster et al. | |
| 10,942,943 B2 | 3/2021 | Thomas et al. | |
| 11,526,531 B2 | 12/2022 | Thomas et al. | |
| 2002/0083210 A1* | 6/2002 | Harrison | H04L 9/40 |
| | | | 707/E17.058 |
| 2003/0126270 A1* | 7/2003 | Lacey, III | H04L 1/18 |
| | | | 709/250 |
| 2008/0212611 A1* | 9/2008 | Johnson | G06F 9/546 |
| | | | 370/473 |
| 2008/0243675 A1* | 10/2008 | Parsons | G06Q 40/00 |
| | | | 705/37 |
| 2012/0089497 A1 | 4/2012 | Taylor et al. | |
| 2015/0095109 A1* | 4/2015 | Kodde | G06Q 40/04 |
| | | | 705/7.29 |
| 2016/0078537 A1 | 3/2016 | Katsuyama et al. | |
| 2022/0414779 A1 | 12/2022 | Studnitzer et al. | |

* cited by examiner

*Primary Examiner* — Caroline H Jahnige
(74) *Attorney, Agent, or Firm* — Leason Ellis LLP

(57) ABSTRACT

A frame signal generator, control signal generator, a finite state machine, a plurality of parsing components, and an amalgamator are provided. A value representing a start of a data frame is identified and a start of frame signal representing at least the start of the data frame output. In response, respective portions of at least a first of a plurality of data messages are extracted and output to the amalgamator. A length of each respective data message is identified and a length value read representing a length of a portion of data in the respective data message. The portion of the data is traversed until reaching the portion's end, and a control signal can be output. In response, to receiving the GO control signal, a respective portion of data extracted and output to the amalgamator, which can receive and output respective portions to an application.

18 Claims, 5 Drawing Sheets

ULTRA-LOW LATENCY PARSING SYSTEM AND METHOD

CROSS-REFERENCE TO RELATED PATENT APPLICATIONS

This application is a continuation of U.S. patent application Ser. No. 18/366,123, filed Aug. 7, 2023, which is incorporated by reference, as if expressly set forth in its respective entirety herein.

FIELD

The present disclosure relates, generally, to data management and, more particularly, to an arrangement and method for improved operations associated with data parsing and handling.

BACKGROUND

In a trading system comprising a field programmable gate array, each sequential computation incurs latency. Market data received from various exchanges provide traders and investors with information, such as an instrument's price and history, that can be analyzed rapidly and used to generate and send orders. Unfortunately, large payloads of market data that are received from various sources, such as exchanges, are often formatted uniquely according to various protocols pursuant to data provider specifications. Some exchanges publish technical data specifications that include information representing data message record layouts in messages. Using the published specifications, custom data processing, including parsing operations, can be developed in advance. Normally, for any particular protocol, a hand-crafted algorithm is required, which is time consuming to develop and can be prone to errors.

In other cases, no advanced technical specification may be available, which requires data handling operations to be managed at run-time. Additionally, information representing a data message, a data record, or other technical detail can be included in or with a data payload, such as in headers or other locations. In addition, large data payloads may include data messages and data records having variable lengths, which can require processing determinations and operations to be made at run-time, including for parsing and outputting fields of data to one or more third-party applications. Processing batches of variable-length messages at runtime can add latency.

A simplified example data record is shown in FIG. 1, which includes field label column 102 and data column 104. Column 102, for example, includes data field labels that identify data included in messages within the data payload, and includes ticker symbol, bid size, ask size, last sale, quote time, trade time, and exchange name. Column 104, for example, illustrates example data stored in the respective data fields.

Delivery of market and other kinds of data to end user applications is highly time sensitive and reducing latency incurred by collecting, parsing, collating, and distributing data, for example, can be paramount. In such cases, ultra-low latency operations for rapid provisioning of data are highly desirable.

Reusable components in computing applications, generally, are useful for reducing development time and improving operational efficiency and accuracy. Unfortunately, applications requiring low latency that support reusable components, generally, often introduce general purpose design elements, which add latency as a byproduct. Such general purpose designs, therefore, are not well-suited in applications seeking to reduce latency, including managing data for trading applications.

Accordingly, there remains a need for providing receiving and processing data messages from each of a plurality of data sources, such as market exchanges, using ultra-low latency parsing operations, for data to be provisioned rapidly to various third-party applications. It is with respect to these and other considerations that the disclosure made herein is presented.

BRIEF SUMMARY

Implementations of the present disclosure include a computer-implemented method and system comprising circuitry including a frame signal generator, control signal generator, a finite state machine, a plurality of parsing components, and an amalgamator. The frame signal generator can identify a value representing a start of a data frame included in a data payload, wherein the data frame includes a plurality of data messages. The frame signal generator can output to at least one of the plurality of parsing components, in response to the frame signal generator identifying the value representing the start of the data frame, a start of frame signal representing at least the start of the data frame. In response to receiving the start of frame signal, the at least one of the plurality of parsing components can extract respective portions of at least a first data message of the plurality of data messages having a respective data length. The at least one of the plurality of parsing components can output the respective portions of at least the first data message to the amalgamator. For each respective data message subsequent to the first data message in the plurality of data messages, the finite state machine can identify a length of the respective data message, and for each of a plurality of portions of data in the respective data message, the finite state machine can read a length value respectively representing a length of a portion of data in the respective data message. The finite state machine can traverse, as a function of the length value, the portion of the data in the respective data message until reaching the portion's end, and can output to at least one other of the plurality of parsing components, a GO control signal. The at least one other of the plurality of parsing components can extract, in response to receiving the GO control signal, a respective portion of data located in the respective data message at a respective offset and ending at a location associated with a respective data length and can output the extracted portion of the data to the amalgamator. Further, the amalgamator can receive, from the at least one of the plurality of parsing components, the respective portions of at least the first data message and output to at least one application, at least some of the respective portions of at least the first data message.

In one or more implementations of the present disclosure, the finite state machine can calculate an adjust factor associated with a data shift associated with the respective data message and output to the at least one other of the plurality of parsing components, the adjust factor with the GO control signal. Extracting, by the at least one other of the plurality of parsing components, can be in response to receiving the GO control signal and the adjust factor, at the respective offset as altered by the adjust factor.

In one or more implementations of the present disclosure, the at least one other of the plurality of parsing components is a variable parsing component.

In one or more implementations of the present disclosure, each of the respective portions of at least the first data message is located at a respective offset.

In one or more implementations of the present disclosure, at least one of the plurality of parsing components is a fixed parsing component and configured with parameters representing an offset and a length.

In one or more implementations of the present disclosure, the parameters are based on a published specification from a provider of the data, wherein the published specification represents a protocol of the data, and further wherein the number of the plurality of parsing components is based on the published specification.

In one or more implementations of the present disclosure, each of the plurality of parsing components can output respective portions of the data in one-byte increments and the amalgamator can receive, from each of the fixed parsing components and the variable parsing components, respective ones of the one-byte increments. The amalgamator can output to the at least one application, at least some of the respective ones of the one-byte increments.

In one or more implementations of the present disclosure, the amalgamator can stop outputting to the at least one application, the respective one-byte increments prior to outputting all of the one-byte increments.

In one or more implementations of the present disclosure, one of the plurality of data messages is formatted in a first protocol and at least one other of the plurality of data messages is formatted in a different protocol.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION OF THE EMBODIMENTS

By way of summary and introduction, the present disclosure includes technology for processing and managing large volumes of variously formatted data from different sources, including for automatic extraction and transmission. The present disclosure includes an arrangement of components configured to receive data, for example, from market exchanges, and to read and parse the data for further processing downstream by third-party applications, such as high-speed trading applications.

In one or more implementations, the present disclosure includes encapsulated reusable parsing components, which can be instantiated with parameters representing, for example, lengths and locations of data fields in respective data messages. The dedicated and reusable components improve efficiency, reduce latency, and reduce the likelihood of programming or other errors that may be introduced by redevelopment. The total number of instantiated reusable components can vary in accordance with a given design, which can further reduce latency.

Figure 1:
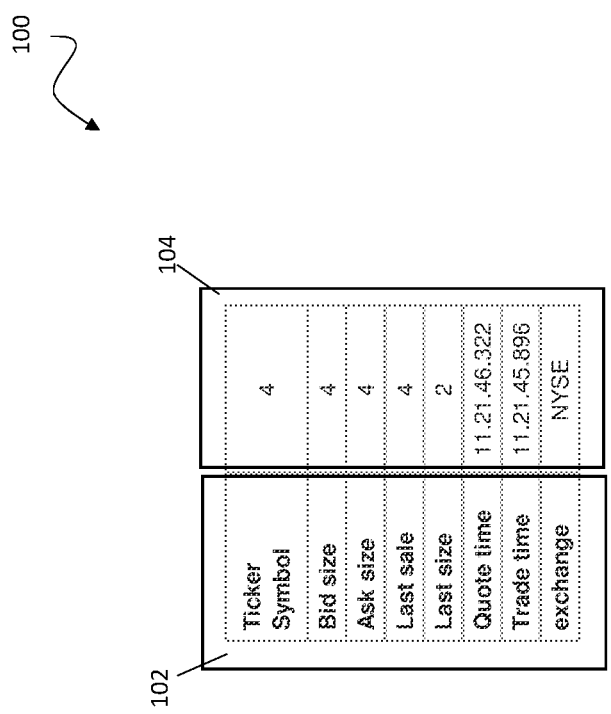
FIG. 1 shows a simplified example data record, which includes field label and data columns.
Figure 2:
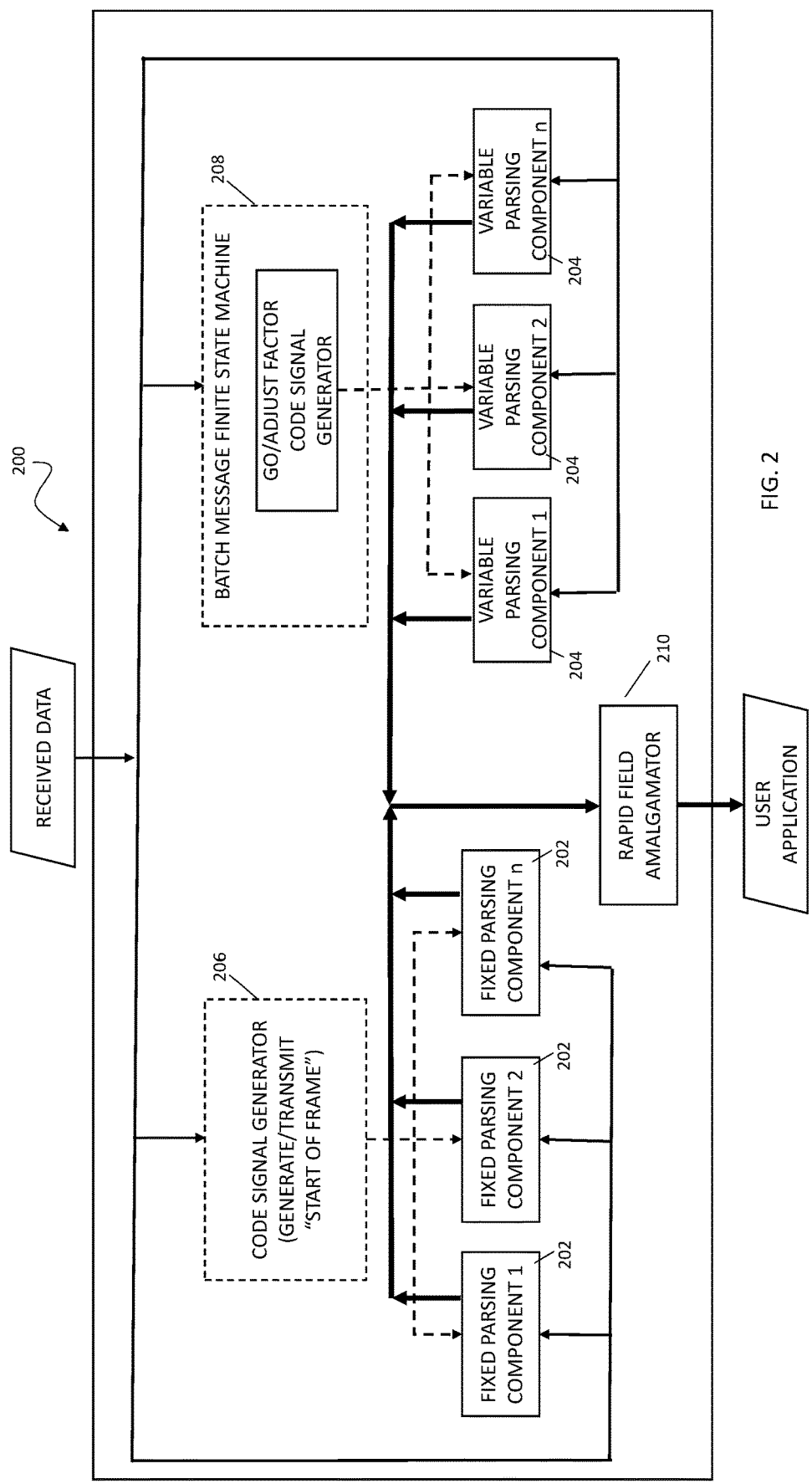
FIG. 2 is a schematic diagram illustrating an example implementation and corresponding flows of information provided in accordance with an example implementation the present disclosure.

Referring now to FIG. 2, a schematic diagram illustrating an example implementation and corresponding flows of information is provided in accordance with an example implementation of an ultra-low latency parsing arrangement, generally referred to herein as low-latency parser 200. In the example shown in FIG. 2, lines terminating in arrows represent various data flow and are provided in particular formats (e.g., thin lines, thick lines, and broken lines) to represent different types of information being processed and output by various components. In one or more implementations, low-latency parser 200 is implemented in a field programmable gate array ("FPGA") and can be implemented using a computing hardware description language, such as VERILOG or VHDL, which can describe hardware components and corresponding operations, such as gates and processes, and which can be downloaded into a FPGA.

Low-latency parser 200 can be configured to operate on data messages in data payloads, including to extract data at fixed locations in the messages, such as pursuant to published specifications provided by providers. In addition to data provided at fixed locations in the messages, data payloads can include batches of variable-length data, which require additional processing to locate and extract. For example, a first message in batch of data messages includes an offer price data field that is located at position 20. A subsequent message in the batch includes an offer price data field located at position 11 relative to the start of the message. The present disclosure can handle these different conditions by providing two types of parsing components, including fixed parsing components 202 and variable parsing components 204.

In one or more implementations of the present disclosure, fixed parsing components 202 can be instantiated from previously developed programming code (i.e., the fixed parsing components can be reusable) and, thus, fast and convenient to implement. Although fixed parsing components 202 are reusable, they can still support parsing operations for varieties of data formats received from different sources. Each of a plurality of fixed parsing components 202 can be configured to locate and extract one respective data field in a data message as a function of at least one parameter provided during instantiation. For example, a market data message stores a 2-byte data field representing a destination internet protocol ("IP") address, which is located at position 42 in the message. A reusable fixed parsing component 202 can be instantiated and configured to read two bytes of data starting at offset 42 (i.e., destination IP address) in the message.

As noted herein, the number of instantiated fixed parsing components 202 in a given implementation can depend on a respective data message being processed and particular design concerns, including the number of corresponding data fields of interest in the message. For example, a high-speed trading application may require only 7 of 100 data fields that are included in a single data message. In such case, low-latency parser 200 supports instantiating only seven fixed parsing components 202, each for parsing one of the 7 data fields. The ability to instantiate fewer fixed parsing components 202 to address particular instances reduces latency and improves overall performance.

Continuing with reference to FIG. 2, a control signal generator 206 is shown, which receives and reads data and recognizes each new start of data frame included therein. Upon recognizing a start of data frame, control signal generator 206 can generate and transmit to fixed parsing components 202 a control signal representing start of data frame ("SOF"). The received SOF control signal can be used by the instantiated fixed parsing components 202 to locate, extract, and transmit respective data fields from the current data message, for example, for use by a downstream third-party application.

As noted herein, data payloads from a variety of sources (e.g., different market exchanges) can include batches of variable-length data messages and data fields. The present disclosure provides an improved architecture for processing such payloads, including a combination of reusable fixed parsing components 202 and variable parsing components 204. As shown in FIG. 2, a batch message finite state machine 208 can be provided that receives and outputs information associated with portions (e.g., fields) of a data message that is included in a batch of messages. Batch message finite state machine 208 is configured for a plurality of states and to operate in accordance with a current state. In response to receiving a code signal representing a start of data frame, batch message finite state machine 208 enters a processing state. During the processing state, for example, batch message finite state machine 208 enters a state to read a length value representing a length of a portion of data, such as 10. The batch message finite state machine 208 can, thereafter, enter a looping process to traverse a data message, for example, using a counter from the start of the portion until reaching the end of the portion, 10 bytes in this example. Thereafter, the batch message finite state machine 208 returns to a state to read the next length value, which may be, for example, 20. In one or more implementations, the length value indicates the length of the next message and can be measured in in bytes. It is to be appreciated that a length indicator can vary, such as by exchange or other data source. The length value may be one byte, two bytes, or other length, and can be encapsulated by a header. The process continues until the end of the message is reached. For example, a market data exchange inserts a 2-byte field at the end of each of each message grouped in a received data payload, in which the 2-byte field represents the length of the next message.

In operation, batch message finite state machine 208 can assert to a variable parsing component 204 a control signal in response to entering a state to read a respective length value. Similar to fixed parsing components 202, each variable state parsing component 204 is respectively configured to extract one portion of data (e.g., a data field) in a message starting at a respective position and having a respective length. Batch message finite state machine 208 can be configured to traverse messages in a data payload comprising a batch of messages, detect and read the length of data fields within a message, and assert the control signal to variable parsing components 204.

Continuing with reference to FIG. 2, batch message finite state machine 208 can include a code signal generator, which outputs code signals to the variable state parsing components 204. For example, after batch message finite state machine 208 receives a start of data frame in a data payload, a control signal referred to herein generally as a "GO" signal can be asserted by batch message finite state machine 208 via a code signal generator. Continuing with reference to FIG. 2, the batch message finite state machine 208 can include a code signal generator and output code signals to the variable state parsing components 204.

In one or more instances, data messages comprised in a received data payload can be formatted for high-speed transmission, such as user datagram protocol ("UDP"). Respective data formatted in a header can represent the length of the total payload, as well as other discrete values representing a type of a message, a length of the message, lengths of data fields within a message, or the like.

In addition to a GO signal, batch message finite state machine 208 also generates a value to account for data shifting that may occur due to processing variable-length data messages and/or fields, resulting in data frames not aligning properly in a given processing clock cycle. For example, a variable parsing component 204 may not correctly identify data at a particular location within a message in instances where message data are misaligned and not technically starting at position 0. Referred to herein generally as an adjust factor, batch message finite state machine 208 determines the extent of shifting that may have occurred and provides the offset factor to variable parsing components 204. Variable parsing components 204 can use the offset factor to adjust the starting position when identifying and parsing data at respective locations. The adjust factor can take into account a case in which the previous message ends and the current message begins in the same data block. The adjust factor shifts the starting position of the target field by subtracting the number of bytes the previous message occupies from the size of the data block. A data block is the number of valid data bytes in a particular clock cycle.

Upon receipt of at least the GO signal, instantiated variable parsing components 204 change state to processing, and proceed to read a length of data at a respective starting position in the message, for example, as governed by one or more parameters configuring respective variable parsing components 204. In one or more implementations of the present disclosure, each instantiated variable parsing component 204 can execute a looping process to locate and extract a length of data, byte by byte, until reaching the end of the read length. As each byte is extracted (e.g., parsed) during the loop, variable parsing component 204 can output the respective byte, for example, to ready field amalgamator 210. The ready field amalgamator 210 can forward respectively received bytes extracted by fixed parsing components 202 and variable parsing components 204 to a third-party application, such as a high-speed trading application, as they are received and without waiting for all data within a respective length to be extracted. Any given application that receives data from ready field amalgamator 210, for example, may be able to determine from fewer than all bytes in a given data field that not all bytes are needed. In such case, the ready field amalgamator 210 can be configured to stop outputting bytes of a respective data field to an application. Alternatively (or in addition), fixed parsing components 202 and variable parsing components 204 can be configured to stop processing (e.g., terminate a looping process) data. Such termination steps can further reduce latency in one or more implementations.

Accordingly, in one or more implementations of the present disclosure each field in a data message can have a length of from 1 to n bytes, and output from the fixed parsing components 202 and variable parsing components 204 can include individual ones of the 1 to n bytes along with a ready signal corresponding with each byte. In operation, after each clock cycle ready field amalgamator 210 receives the byte(s)

and ready signal(s) from respective parsing components and output the received byte(s) to application(s). In one or more implementations, the ready field amalgamator 210 can be configured with logic to wait until a predetermined number of bytes (e.g., one or more bytes, depending on a particular field and application) have been received from a respective parsing component before outputting the byte(s) to an application. In an ultra-low latency application space, such logic included in a ready field amalgamator 210 further provides speed improvements and reduces latency.

Furthermore, in one or more implementations of the present disclosure ready field amalgamator 210 identifies a data field associated with received byte(s), for example, by recognizing the respective outputting parsing component 202/204. Alternatively (or in addition), information can be included with the data identifying a data field (e.g., a field label) that can be recognized by the amalgamator. In response to recognizing the data field, ready field amalgamator 210 can execute logic to output received individual ones of bytes to an application or to collect additional byte(s) prior to outputting to an application. In addition, other implementations are supported, which can include ready field amalgamator 210 executing logic to wait until all bytes of an entire data field have been received prior to outputting data to a given application.

In one or more implementations of the present disclosure, batch message finite state machine 208 does not assert a GO signal to the variable parsing component(s) while processing a first message of a batch of messages. In such case, reliance is on fixed parsing components 202 extracting data in the first message of the batch. Although batch message finite state machine 208 can read through the first message, no GO signal is asserted and, accordingly, the variable parsing components 204 remain in an idle state. After the first message is parsed, batch message finite state machine 208 continues reading through the message data until the next message begins. From the second message on, batch message finite state machine 208 can output the GO signal as well as additional information, such as an adjust factor, as shown and described herein. Also in such instances, after the first of a batch of messages is processed, no start of data frame value is output by code signal generator 206 and, accordingly, the fixed parsing components 202 remain in an idle state.

In certain implementations, for example, depending on a goal of a particular design, no variable parsing components 204 or batch message finite state machine 208 is used to process a data payload. In such instances, for example, only some data in a data payload is of interest and the fixed parsing components 202 operate to handle all parsing processes. Use of just fixed parsing components 202 can further decrease latency by eliminating latency resulting from variable parsing. Some designs using the present disclosure, for example, only use the first message stored in each data frame. In such cases, fewer clock cycles can be used by employing only fixed parsing components 202 on data messages.

In other implementations, a hybrid approach can be used, for example, to balance latency concerns with an interest in accessing data in a message. Fixed parsing components can be used to process the first message in a frame and batch message finite state machine 208 and variable parsing components 204 process the remaining messages in the batch. In yet another alternative, such as where latency is not a concern, just batch message finite state machine 208 and variable parsing components 204 can be used for the entire process. In operation, an analysis of market data provided by a particular exchange. An exchange may provide via a 10 gigabyte line, for example, various electronic market data in different frame lengths is provided. A different exchange may provide electronic market data, in which each message is formatted the same way. The present disclosure supports applications that process that is formatted in virtually any particular way.

In one or more implementations, implementations including developing processes described herein can be automated. In such instances, one or more specifications of market data provided by an exchange are published by the exchange, for example. Specifications can be published in extensible markup language ("XML") or other format that can be interpreted and used to develop parsing aspects of associated with a data processing application automatically.

In certain implementations where data payloads are provided in standard and repeatable formats, fixed and/or variable parsing components can be implemented in preprogrammed FPGA components. By configuring an FPGA with data processing programming, latency resulting from parsing operations can be further reduced. For example, adder and shifter operations can be coded in the FPGA for data parsing operations.

Accordingly, the present disclosure provides improvements in data processing, including with regard to parsing processes and providing data to applications. For example, the present disclosure provides reusable fixed parsing components for messages. A benefit of the present disclosure is the ability to improve parsing operations for a batch of messages to what appears to be individual messages. Ultra-low latency is provided by dividing message parsing operations between fixed parsing components and variable parsing components.

Figure 3:
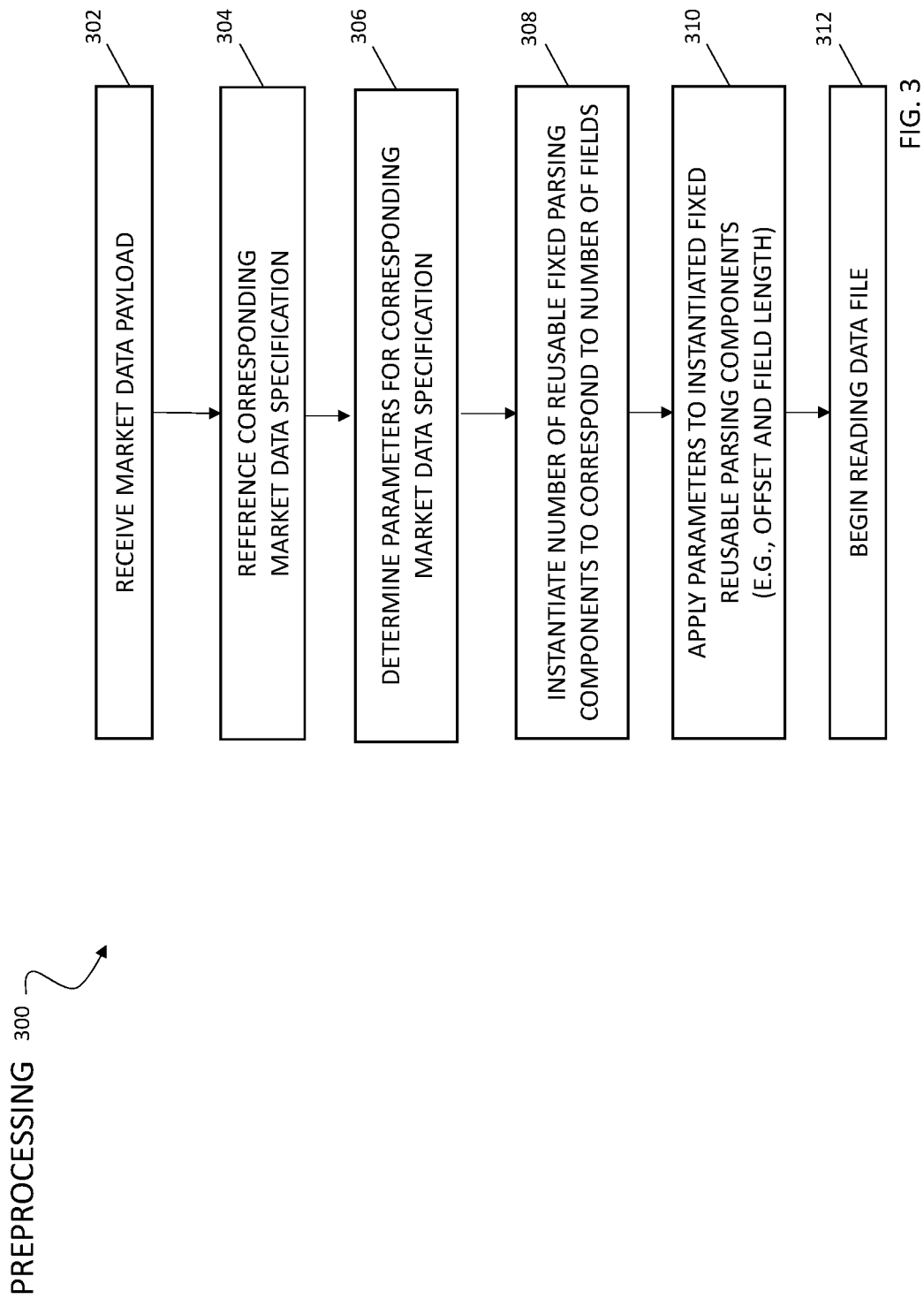
FIG. 3 is a flow chart illustrating example preprocessing steps, in accordance with an example implementation of the present disclosure.

FIG. 3 is a flow chart illustrating example steps 300 that are associated with preprocessing in accordance with an example implementation of the present disclosure. It should be appreciated that several of the logical operations described herein are implemented (1) as a sequence of computer implemented acts or program modules running on a communication device and/or (2) as interconnected machine logic circuits or circuit modules within a communication device. The implementation is a matter of choice dependent on the requirements of the device (e.g., size, energy, consumption, performance, etc.). Accordingly, the logical operations described herein are referred to variously as operations, structural devices, acts, or modules. Several of these operations, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

In the example steps shown in FIG. 3, the process begins at step 302 and a data payload, for example, including market data, is received from source, such as from an exchange. Thereafter, at step 304, a published data specification provided by the data source, such as describing data included in the data payload, is referenced and used to determine parameters corresponding to a respective specification (step 306). At step 308, a number of reusable fixed parsing components 202 are instantiated, each corresponding to a respective field identified by the published data specification. Moreover, the parameters determined from step 306 are applied in step 310 to the instantiated fixed parsing components 202. Thereafter, at step 312, the data payload is read.

Figure 4:
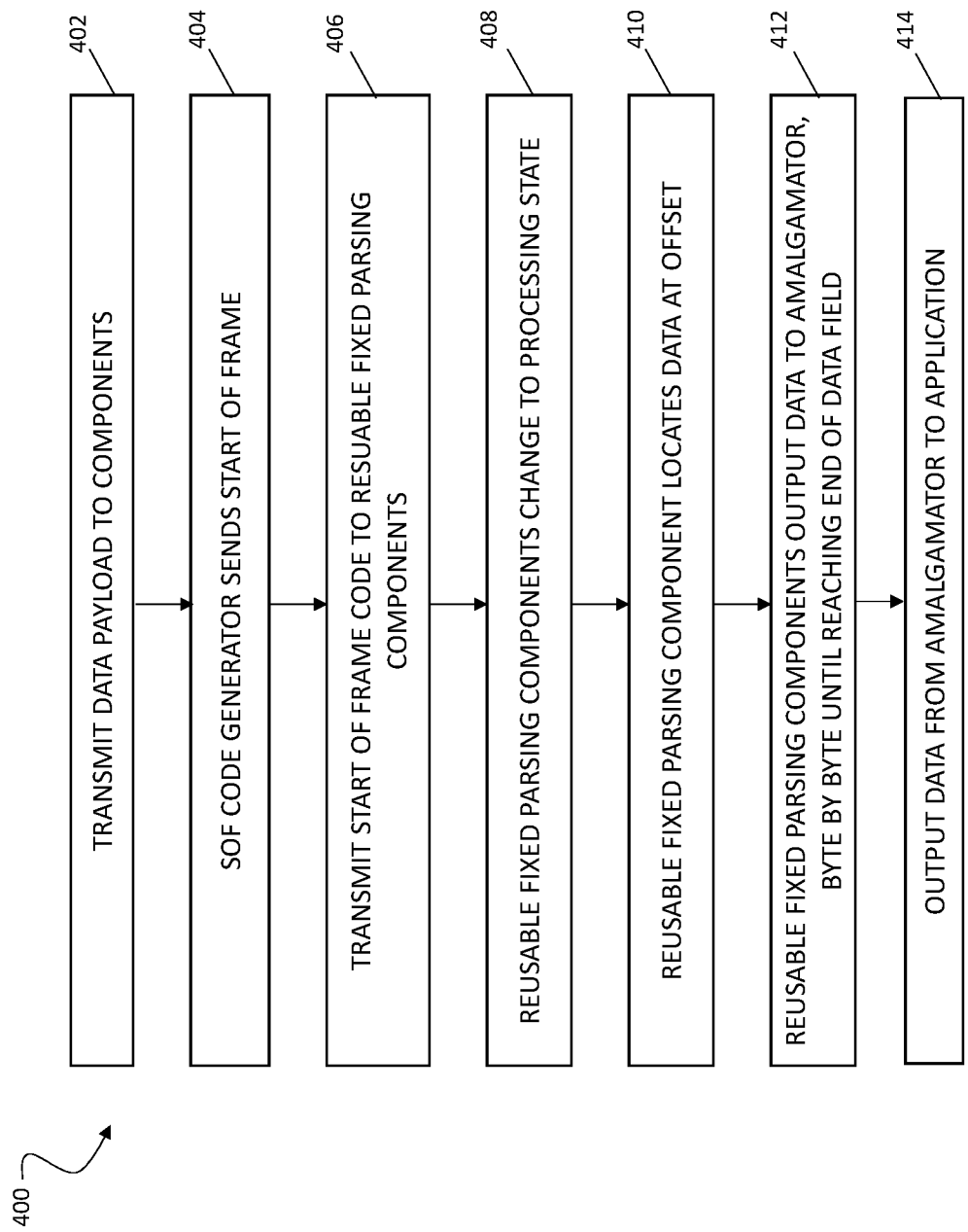
FIG. 4 illustrates an example process in connection with reusable fixed parsing components, in accordance with an example implementation of the present disclosure.

FIG. 4 illustrates an example process 400 in connection with reusable fixed parsing components 202. At step 402, the data payload is transmitted to respective components in ultra-low-latency parser 200. At step 404, a start of data frame code generator 206 identifies a start of data frame code and thereafter, at step 406, transmits a start of data frame signal to the reusable fixed parsing components 202. The reusable fixed parsing components 202 receive the start of data frame signal from the generator 206 and change state for processing (step 408). At step 410, the reusable fixed parsing components 202 locate data at respective offsets, in accordance with parameters instantiated therewith (308, FIG. 3). At step 412, the reusable fixed parsing components 202 can be configured to output data to amalgamator 210, byte by byte, until reaching the end of data field. Thereafter, at step 414, data or output from the amalgamator 210 to a third-party application, such as a high-speed trading application.

Figure 5:
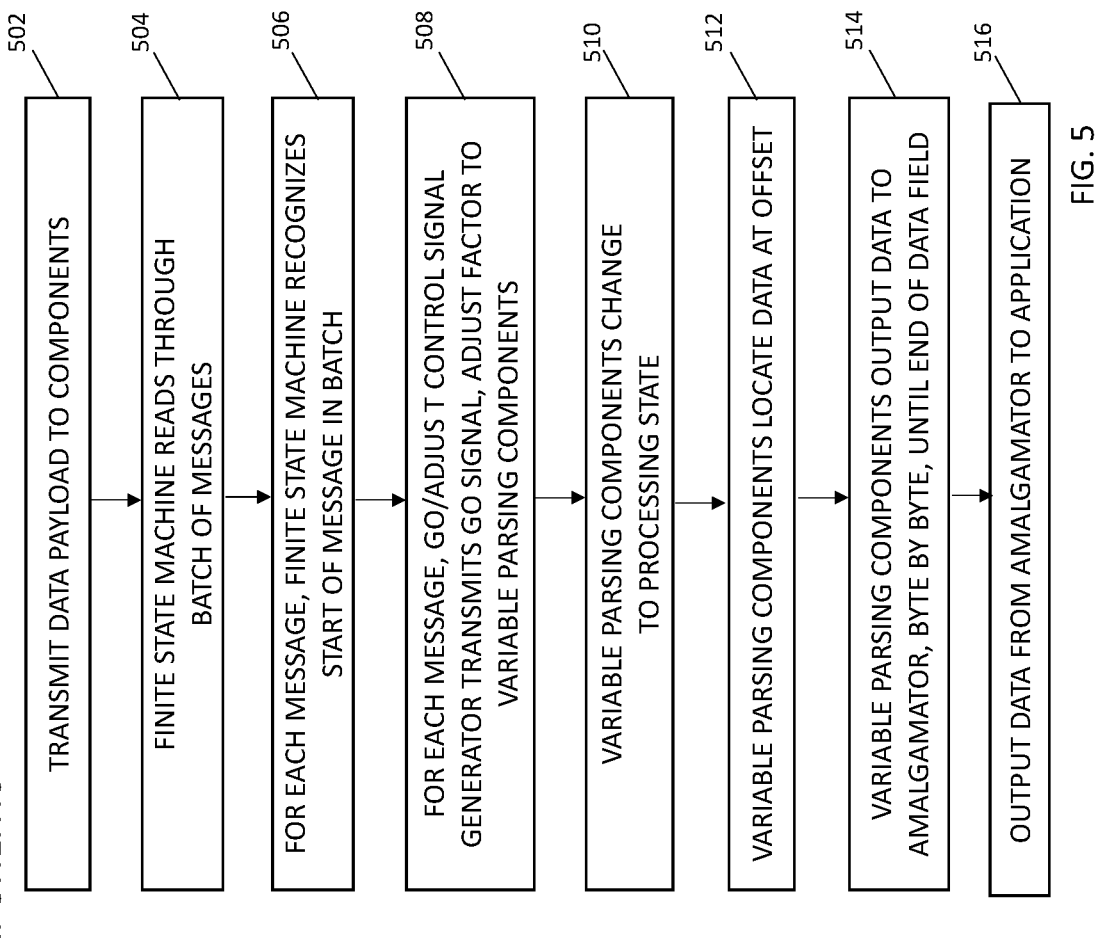
FIG. 5 illustrates an example process in connection with variable parsing components, in accordance with an example implementation of the present disclosure.

FIG. 5 illustrates an example process 500 in connection with variable parsing components 204. At step 502, the data payload is transmitted to respective components in ultra-low-latency parser 200. At step 504, batch message finite state machine 208 reads through a batch of messages comprised in the data payload. For each message, the batch message finite state machine 208 identifies a start of message within the batch (step 506). At step 508, for each message, the batch message finite state machine 208 transmits, via a respective code signal generator, a GO signal and an adjust factor value to the variable parsing components 204. The variable parsing components 204 receive the GO signal and adjust factor and change state for processing (step 510). At step 512, the variable parsing components 204 locate data at respective offsets in a message, including as modified by a respective adjust factor. The variable parsing components output extracted data, byte by byte, until reaching the end of the data field (step 514). At step 516, data are output from the amalgamator 210 to a third party application, such as a high-speed trading application.

Accordingly, the present disclosure provides improvements in data parsing technology, including with parameterized pipeline stages for fine grain latency control. Calculations, including as made by parsing controls, can be pre-computed which results in resource savings and reductions in latency. Further, byte level output can be provided, which further reduces latency. In addition, reusable components for faster and more accurate development cycles, in which parsing components can be instantiated with parameters derived from published data specifications. Other components can be configured by logic that can optimize operations to further reduce latency. The present disclosure lowers latency, for example, in a parser implemented in a field programmable gate array by a combination of pre-computation and dynamic branch selection processes. Furthermore, the present disclosure generalizes the solution for rapid adoption through parameterization and by supporting virtually any data protocol.

Although many of the examples shown and described herein regard distribution of coordinated presentations to a plurality of users, the disclosure and invention(s) therein is not so limited. Although illustrated embodiments of the present invention have been shown and described, it should be understood that various changes, substitutions, and alterations can be made by one of ordinary skill in the art without departing from the scope of the present disclosure.

What is claimed is:

1. A computerized data parsing apparatus, comprising:
circuitry including a frame signal generator, control signal generator, a finite state machine a plurality of parsing components, and an amalgamator, wherein the circuitry is configured to perform steps including:
   identifying, by the frame signal generator, a value representing a start of a data frame included in a data payload, wherein the data frame includes a plurality of data messages;
   outputting, by the frame signal generator to at least one of the plurality of parsing components in response to the frame signal generator identifying the value representing the start of the data frame, a start of frame signal representing at least the start of the data frame;
   extracting, by the at least one of the plurality of parsing components in response to receiving the start of frame signal, respective portions of at least a first data message of the plurality of data messages having a respective data length;
   outputting, by the at least one of the plurality of parsing components, the respective portions of at least the first data message to the amalgamator;
   for each respective data message subsequent to the first data message in the plurality of data messages:
      identifying, by the finite state machine, a length of the respective data message;
      for each of a plurality of portions of data in the respective data message:
         reading, by the finite state machine, a length value respectively representing a length of a portion of data in the respective data message;
         traversing, by the finite state machine, as a function of the length value, the portion of the data in the respective data message until reaching the portion's end;
         outputting, by the finite state machine to at least one other of the plurality of parsing components, a GO control signal;
         extracting, by the at least one other of the plurality of parsing components, in response to receiving the GO control signal, a respective portion of data located in the respective data message at a respective offset and ending at a location associated with a respective data length; and
   outputting, by the at least one other of the plurality of parsing components, the extracted portion of the data to the amalgamator;
   receiving, by the amalgamator from the at least one of the plurality of parsing components, the respective portions of at least the first data message; and
   outputting, by the amalgamator to at least one application, at least some of the respective portions of at least the first data message.

2. The apparatus of claim 1, wherein the circuitry is further configured to perform steps including:
   calculating, by the finite state machine, an adjust factor associated with a data shift associated with the respective data message; and
   outputting, by the finite state machine to the at least one other of the plurality of parsing components, the adjust factor with the GO control signal,
   wherein extracting, by the at least one other of the plurality of parsing components, is in response to receiving the GO control signal and the adjust factor, at the respective offset as altered by the adjust factor.

3. The apparatus of claim 2, wherein the at least one other of the plurality of parsing components is a variable parsing component.

4. The apparatus of claim 1, wherein each of the respective portions of at least the first data message is located at a respective offset.

5. The apparatus of claim 1, wherein at least one of the plurality of parsing components is a fixed parsing component and configured with parameters representing an offset and a length.

6. The apparatus of claim 5, wherein the parameters are based on a published specification from a provider of the data, wherein the published specification represents a protocol of the data, and further wherein the number of the plurality of parsing components is based on the published specification.

7. The apparatus of claim 1, wherein the circuitry is further configured to perform the following:
output, by each of the plurality of parsing components, respective portions of the data in one-byte increments;
receive, by the amalgamator from each of the fixed parsing components and the variable parsing components, respective ones of the one-byte increments; and
output, by the amalgamator to the at least one application, at least some of the respective ones of the one-byte increments.

8. The apparatus of claim 7, wherein the circuitry is further configured to perform the following:
stop outputting, by the amalgamator to the at least one application, the respective one-byte increments prior to outputting all of the one-byte increments.

9. The apparatus of claim 1, wherein one of the plurality of data messages is formatted in a first protocol and at least one other of the plurality of data messages is formatted in a different protocol.

10. A computerized data parsing method, comprising:
identifying, by a frame signal generator, a value representing a start of a data frame included in a data payload, wherein the data frame includes a plurality of data messages;
outputting, by the frame signal generator to at least one of a plurality of parsing components in response to the frame signal generator identifying the value representing the start of the data frame, a start of frame signal representing at least the start of the data frame;
extracting, by the at least one of the plurality of parsing components in response to receiving the start of frame signal, respective portions of at least a first data message of the plurality of data messages having a respective data length;
outputting, by the at least one of the plurality of parsing components, the respective portions of at least the first data message to an amalgamator;
for each respective data message subsequent to the first data message in the plurality of data messages:
identifying, by a finite state machine, a length of the respective data message;
for each of a plurality of portions of data in the respective data message:
reading, by the finite state machine, a length value respectively representing a length of a portion of data in the respective data message;
traversing, by the finite state machine, as a function of the length value, the portion of the data in the respective data message until reaching the portion's end;
outputting, by the finite state machine to at least one other of the plurality of parsing components, a GO control signal;
extracting, by the at least one other of the plurality of parsing components, in response to receiving the GO control signal, a respective portion of data located in the respective data message at a respective offset and ending at a location associated with a respective data length; and
outputting, by the at least one other of the plurality of parsing components, the extracted portion of the data to the amalgamator;
receiving, by the amalgamator from the at least one of the plurality of parsing components, the respective portions of at least the first data message; and
outputting, by the amalgamator to at least one application, at least some of the respective portions of at least the first data message.

11. The method of claim 10, further comprising:
calculating, by the finite state machine, an adjust factor associated with a data shift associated with the respective data message; and
outputting, by the finite state machine to the at least one other of the plurality of parsing components, the adjust factor with the GO control signal,
wherein extracting, by the at least one other of the plurality of parsing components, is in response to receiving the GO control signal and the adjust factor, at the respective offset as altered by the adjust factor.

12. The method of claim 11, wherein the at least one other of the plurality of parsing components is a variable parsing component.

13. The method of claim 10, wherein each of the respective portions of at least the first data message is located at a respective offset.

14. The method of claim 10, wherein at least one of the plurality of parsing components is a fixed parsing component and configured with parameters representing an offset and a length.

15. The method of claim 14, wherein the parameters are based on a published specification from a provider of the data, wherein the published specification represents a protocol of the data, and further wherein the number of the plurality of parsing components is based on the published specification.

16. The method of claim 10, further comprising:
outputting, by each of the plurality of parsing components, respective portions of the data in one-byte increments;
receiving, by the amalgamator from each of the fixed parsing components and the variable parsing components, respective ones of the one-byte increments; and
outputting, by the amalgamator to the at least one application, at least some of the respective ones of the one-byte increments.

17. The method of claim 16, further comprising:
stop outputting, by the amalgamator to the at least one application, the respective one-byte increments prior to outputting all of the one-byte increments.

18. The method of claim 10, wherein one of the plurality of data messages is formatted in a first protocol and at least one other of the plurality of data messages is formatted in a different protocol.

* * * * *